United States Patent
Ganesh et al.

(10) Patent No.: US 8,245,013 B2
(45) Date of Patent: Aug. 14, 2012

(54) MAPPED OFFSETS PRESET AHEAD OF PROCESS MIGRATION

(75) Inventors: Perinkulam I. Ganesh, Round Rock, TX (US); David A. Hepkin, Austin, TX (US); Rajeev Mishra, Karnataka (IN); Mark D. Rogers, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/249,615

(22) Filed: Oct. 10, 2008

(65) Prior Publication Data

US 2010/0095074 A1    Apr. 15, 2010

(51) Int. Cl.
*G06F 9/445* (2006.01)
*G06F 12/08* (2006.01)

(52) U.S. Cl. ............... 711/209; 711/154; 711/E12.016; 718/105

(58) Field of Classification Search ................. 711/154, 711/209, E12.002, E12.016; 718/105
See application file for complete search history.

(56) References Cited

U.S. PATENT DOCUMENTS

| | | | |
|---|---|---|---|
| 5,442,802 A * | 8/1995 | Brent et al. | 718/100 |
| 6,047,323 A | 4/2000 | Krause | |
| 6,804,729 B2 | 10/2004 | Swanberg | |
| 6,938,039 B1 | 8/2005 | Bober et al. | |
| 7,200,705 B2 | 4/2007 | Santos et al. | |
| 7,424,547 B2 | 9/2008 | Sato | |
| 7,434,021 B2 | 10/2008 | Chauvel et al. | |
| 7,484,208 B1 * | 1/2009 | Nelson | 718/1 |
| 7,594,138 B2 | 9/2009 | Abdulvahid | |
| 7,925,850 B1 * | 4/2011 | Waldspurger et al. | 711/162 |
| 2002/0129115 A1 * | 9/2002 | Noordergraaf et al. | 709/213 |
| 2005/0132250 A1 * | 6/2005 | Hansen et al. | 714/5 |
| 2007/0055715 A1 | 3/2007 | Achiwa | |
| 2007/0094235 A1 | 4/2007 | Akagawa et al. | |
| 2007/0130566 A1 | 6/2007 | van Rietschote et al. | |
| 2007/0162462 A1 | 7/2007 | Zhang et al. | |
| 2007/0234342 A1 | 10/2007 | Flynn et al. | |
| 2007/0294578 A1 * | 12/2007 | Qiao et al. | 714/17 |
| 2008/0127182 A1 * | 5/2008 | Newport et al. | 718/1 |
| 2008/0155214 A1 | 6/2008 | Shitomi | |

(Continued)

FOREIGN PATENT DOCUMENTS

JP        406187308 A      7/1994

OTHER PUBLICATIONS

Zayas, E. ; Attacking the Process Migration Bottleneck ; ACM SIGOPS Operating Systems Review article ; Nov. 1987 ; pp.: 13-24 ; vol. 21, Issue 5 ; ACM SIGOPS ; Carnegie Mellon University, Pittsburgh, PA, US.

(Continued)

*Primary Examiner* — Hal Schnee
(74) *Attorney, Agent, or Firm* — Robert C. Rolnik; Libby Z. Toub

(57) ABSTRACT

Disclosed is a computer implemented method and computer program product to prioritize paging-in pages in a remote paging device. An arrival machine receives checkpoint data from a departure machine. The arrival machine restarts at least one process corresponding to the checkpoint data. The arrival machine determines whether a page associated with the process is pinned. The arrival machine associates the page to the remote paging device, responsive to a determination that the page is pinned. The arrival machine touches the page.

12 Claims, 8 Drawing Sheets

U.S. PATENT DOCUMENTS

| | | | |
|---|---|---|---|
| 2008/0273457 A1 | 11/2008 | Sun et al. | |
| 2008/0307414 A1 | 12/2008 | Alpern et al. | |
| 2009/0083021 A1* | 3/2009 | Gan et al. | 703/24 |
| 2010/0070775 A1* | 3/2010 | Dik et al. | 713/187 |

OTHER PUBLICATIONS

C. Sapuntzakis, R. Chandra, B. Pfaff, J. Chow, M. Lam, M. Rosenblum; Optimizing the Migration of Virtual Computers; Dec. 2002; pp.: 14; Stanford University; Stanford, California, US.

C. Clark, K. Fraer, S. Hand, J. Hansen, E. Jul, C. Limpach, I. Pratt, A. Warfield; Live Migration of Virtual Machines; NSDI '05; May 2005; pp.: 1-14; Proceedings of the 2nd Symposium on Networked Systems Design and Implementation (NSDI '05); NSDI; Boston, Massachusetts, US.

E. Roush, R. Campbell; Fast Dynamic Process Migration; May 1996; pp.: 637-645; The 1996 16th International Conference on Distributed Computing Systems; ICDCS; Hong Kong, Hong Kong.

R. Ho, C. Wang, F. Lau; Lightweight Process Migration and Memory Prefetching in openMosix; Apr. 2008; pp. 2147-2158; Proceedings of the 2008 IEEE International Parallel & Distributed Processing Symposium; IEEE; Miami, Florida, US.

J. Smith, J. Ioannidis; Implementing Remote fork() with Checkpoint/Restart; IEEE Technical Committee on Operating Systems Newsletter article; Feb. 1989; pp. 12-16; University of Pennsylvania; Philadelphia, PA.

T. Tannenbaum; Zap & VMMigration: Zap and Virtual Machine Process Migration; Feb. 2006; pp. 4; CS 739: Distributed Systems; University of Wisconsin; Madison, Wisconsin, US.

Hottelet, Henry; Office Action; Dated Jun. 17, 2011; U.S. Appl. No. 12/249,701; USPTO.

Rolnik, Robert; Response to Office Action; Dated Sep. 13, 2011; U.S. Appl. No. 12/249,701; USPTO.

Stephen A. Ward and Robert H. Halstead Jr, "Comutation Structures", published 1999, pp. 488, 545-547, McGraw-Hill Book Company.

Rutz, Jared; Office Action, Jan. 19, 2012; U.S. Appl. No. 12/249,701; USPTO.

Hennessy, et al; Computer Organization and Design, 1998, Morgan Kauffman, Inc., second edition, pp. 583-587.

Nguyen, Binh, Linux filesystem Hierarchy, Jul. 30, 2004, [online] http://tldp.org/LDP/Linux-Filesystem-Hierarchy/Linux-Filesystem-Hierarchy.pdf [retrieved from the Internet Jan. 14, 2012], version 65.

* cited by examiner

MAPPED OFFSETS PRESET AHEAD OF PROCESS MIGRATION

CROSS REFERENCE TO RELATED APPLICATIONS

This application is related to commonly assigned and co-pending U.S. patent application Ser. No. 12/249,701 entitled "ON-DEMAND PAGING-IN OF PAGES WITH READ-ONLY FILE SYSTEM," filed on even date herewith and hereby incorporated by reference.

BACKGROUND OF THE INVENTION

1. Field of the Invention

The present invention relates generally to a computer implemented method, data processing system, and computer program product for migrating processes from one data processing system to a second data processing system. More specifically, the present invention relates to a departure machine mapping process-depending pages prior to sending the page-out to an arrival machine. A dependent page, or a process-depending page, is a page that a process depends upon in the arrival machine, but for which, at the time that processes are created, is not present, even as a copy, in the arrival machine.

2. Description of the Related Art

Process migration is used by data center managers to transfer running processes from one machine or data processing system to a second machine. The first machine is a departure machine. Accordingly, the departure machine is a source for processes and the process-depending pages that the processes rely on for correct operation. An arrival machine is the second machine in this configuration. An arrival machine is a data processing system to which processes are migrated.

A virtual memory system is a memory management system that allows machines with data and code requirements that exceed physical memory availability to function such that pages of memory are moved back and forth between a paging device and physical memory. Physical memory is a form of storage that allows storage of words or bytes one at a time, in random order, without significant delays as compared to storing tracts of data to contiguous words or bytes. In contrast, a paging device is a block device that accesses data in units of pages. Memory can be either a physical memory or a paging device. A paging device can be, for example, magnetic media, optical media, or flash memory.

A paging device can be local or remote. The designation "local paging device" means that the paging device is local with respect to the physical memory for which it serves as a backing store. The term "local" means that the device is directly attached to a single computer's motherboard or backplane by any combination of bus bridge, PCI bridge, i/o bridge, the computer's bus, or universal serial bus. The term "remote" means that the device is separated from the computer motherboard or backplane by at least a cable hosting networking traffic such as asynchronous transfer mode (ATM), transport control protocol internet protocol (TCP/IP), Ethernet, and the like.

A page is the smallest unit of virtual memory that is moved from physical memory to a paging device and vice-a-versa. A page includes at least a hundred bytes, for example, 4K or 16K page sizes are typical. A page can be a zeroed page. A zeroed page is a page where all bytes of the page are set to the same number, for example 0x0. Accordingly, a zeroed page can be a page that is filled with zeros. A zeroed page can be an uninitialized page.

Among the challenges faced by data center managers is balancing load among several machines. Load balancing can be improved by occasionally migrating processes among machines. However, the cost to migrating processes is that processor time and communication resources are devoted to transferring code and data corresponding to each migrated process to the arrival machine.

SUMMARY OF THE INVENTION

The present invention provides a computer implemented method and apparatus to prioritize paging-in pages in a remote paging device. An arrival machine receives checkpoint data from a departure machine. The arrival machine restarts at least one process corresponding to the checkpoint data. The arrival machine determines whether a page associated with the process is pinned. The arrival machine associates the page to the remote paging device, responsive to a determination that the page is pinned. The arrival machine touches the page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
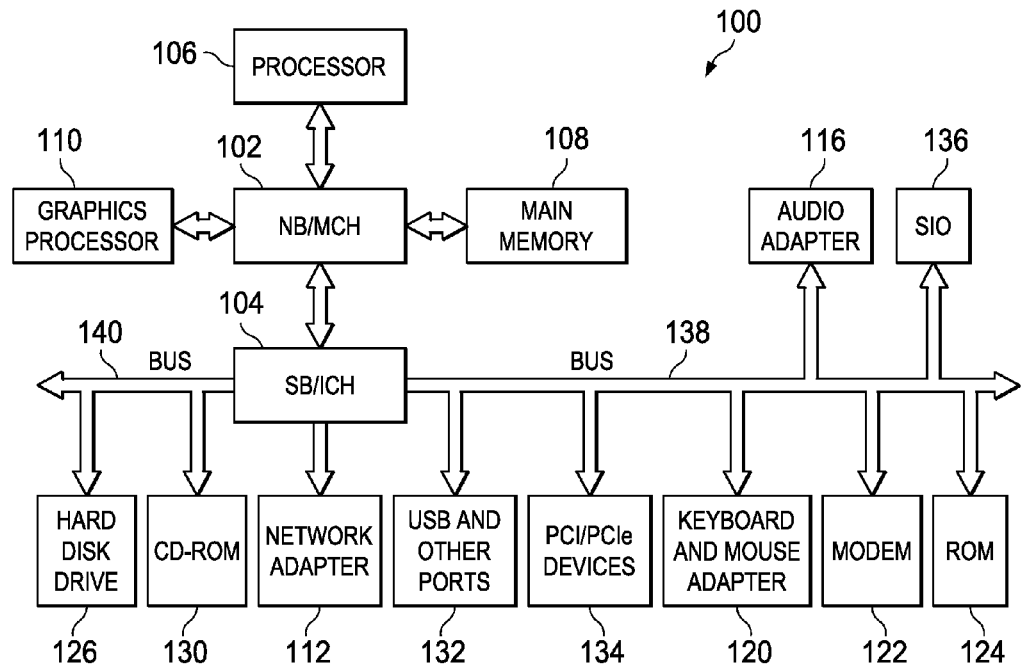
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP or UNIX®. Microsoft and Windows are trademarks of Microsoft Corporation in the United States, other countries, or both. UNIX is a trademark of The Open Group in the United States and other countries. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for paging-in pages on-demand according to a page table created on an arrival machine. Accordingly, migrating pages can be, in part, paged-in to the arrival machine on demand of the process that depends on such pages. Such process-depending pages can be given priority in accordance with the normal order of processing such that seldom-accessed migrating pages can be paged-in to the arrival machine following an initial burst of paging-in pages on demand. Migrating pages are pages that are process depending pages. Seldom-accessed migrating pages are pages that are seldom accessed by the migrating process. In addition, one or more embodiments may allow paging-in pages to the arrival machine even before a process that depends on such pages is resumed on the arrival machine. Moreover, pages that are already on an arrival machine by virtue of an identical but separate instance of an identical software load on the arrival machine may be excluded from paging-in remotely from the departure machine.

In addition, illustrative embodiments of the present invention may bring in pages on demand thereby making processes more responsive without undue congestion on the wire from less-urgent data transfers. A background kernel process may bring in remaining dependent pages in response to a diminishing load of on-demand transfers. Such dependent pages can be brought in to the arrival machine after many on-demand pages are brought in, yet without the bother of waiting until all pages are touched by the processes in their normal course of operation.

Figure 2:
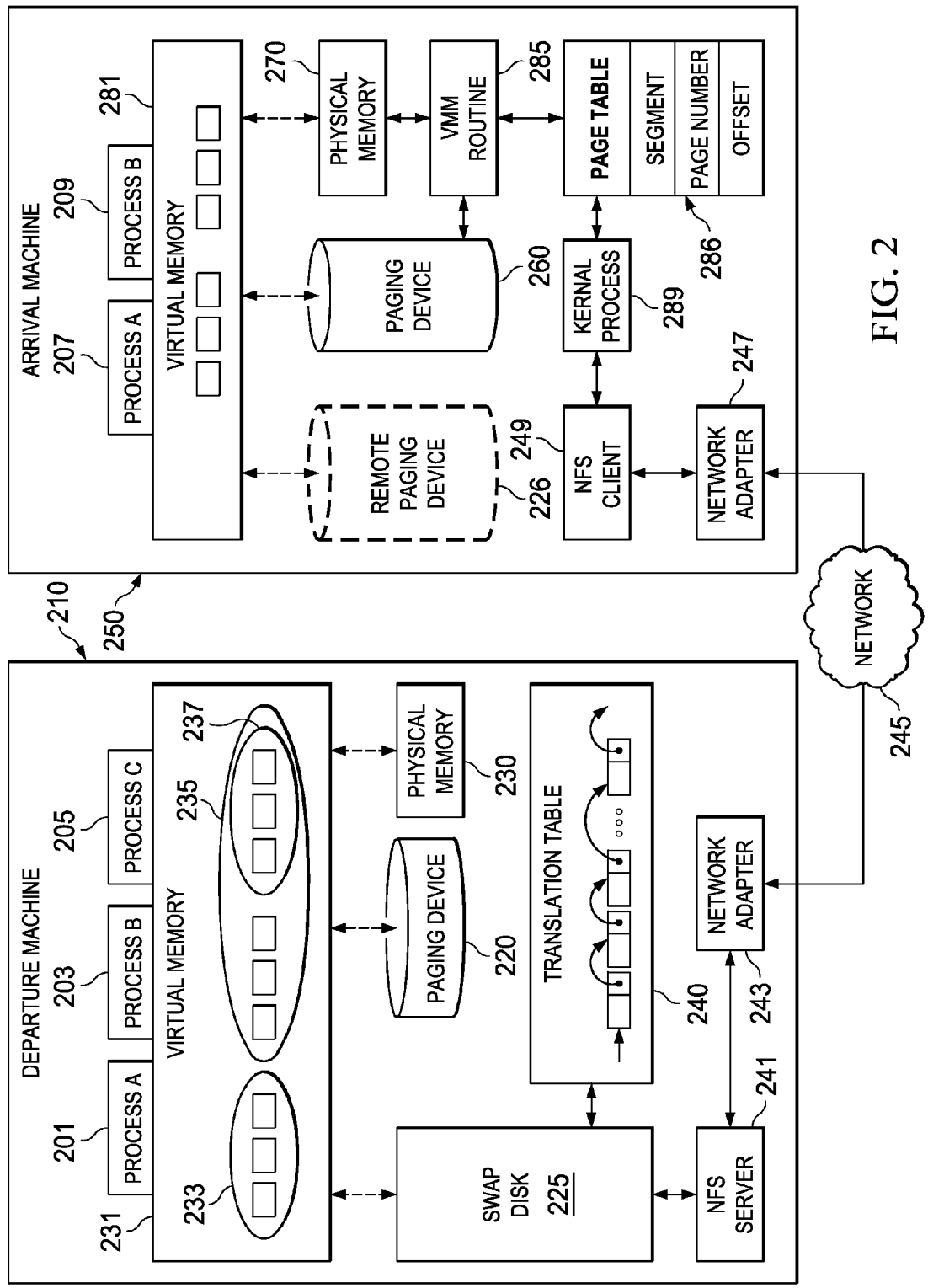
FIG. 2 is a block diagram of a departure machine and an arrival machine in accordance with an illustrative embodiment of the invention.

FIG. 2 is a block diagram of a departure machine and an arrival machine in accordance with an illustrative embodiment of the invention. Departure machine 210 hosts processes that are targeted for migration to arrival machine 250. Departure machine 210 and arrival machine 250 may be arranged, for example, according to data processing system 100 of FIG. 1. A process is the combination of executable instructions and state information for a process that is either running or suspended. A process may also include specific hardware reserved for use by the process and/or hardware that is scheduled for use by the process. A process may be selected for migration, for example, by a system administrator. For example, process B 203 and process C 205 may be selected for migration to arrival machine 250. In contrast, process A 201 may not be targeted for migration. Such a process may continue operating on departure machine 210 when migration is occurring for process B 203 and process C 205. At varying times, a process may be running or frozen. A frozen process is a process that is halted in its execution on a data processing system, but for which a current state is maintained. A running process may be frozen, for example, by using an AIX 'suspend' signal.

Departure machine 210 may support a virtual memory system that abstracts page storage as a collection of pages that can be stored either to physical memory 230 or paging device 220. Virtual memory 231 is the data structure that identifies where the data for a particular page is located. Each page of virtual memory is symbolically shown as a box. The number of pages in virtual memory may number well above nine, and can vary widely, though typically may be expected to count in the thousands.

Pages in virtual memory 231 are divided into three groups. These groups include, pages of non-migrating processes 233, migrating process pages 235, and seldom-accessed migrating process pages 237. Pages 233 of non-migrating processes can support a process that is not selected for migrating. On the other hand, migrating process pages 235 support processes that are selected for migrating, for example, process B 203 and process C 205. Seldom accessed migrating pages 237 may be with-held from an initial transfer of pages to the arrival machine.

Ordinary steady-state operation of a machine may rely on software components to handle networking and disk access functions. Accordingly, network file system (NFS) server 241 and NFS client 249 may be present in each data processing system. Network adapter 243 and network adapter 247, respectively, may support NFS server 241 and NFS client 249 to communicate via network 245 to accomplish process transfer tasks and other communication tasks.

In an illustrative embodiment of the invention, swap disk 225 may be established to respond to requests by remote processes for pages that are required to be transferred to the arrival machine. A swap disk is one or more tables stored to a memory that references pages in a virtual memory system. A reference is an address or one or more links to an address to a physical memory or a physical storage device that provides at least an offset from a landmark of the memory or physical storage used to locate data stored therein. A remote swap disk to an arrival machine is a swap disk that is remote from an arrival machine. Swap disk 225 may be created for the purpose of process transfer. Accordingly, swap disk 225 may be filled with metadata for referencing dependent pages. Once populated with metadata concerning the files and supporting dependent pages, the departure machine may mount the swap disk such that the swap disk responds to read-only accesses of the data of dependent pages. In other words, from the point of view of virtual remote paging device 226, the operations of writing to the swap disk are inhibited by the swap disk 225. The swap disk implements a subset of NFS operations such that remote paging device 226 is unable to write to paging device 220 and physical memory 230 that actually stores the dependent pages. A read-only swap disk is a disk that is mounted in a data processing system and is used only for reading data.

Each file placed into swap disk 225 has one or more corresponding translation tables. Each such translation table is stored to translation table list 240. Translation tables are explained further with reference to FIGS. 3B and 3C, below.

The arrival machine 250 can include process A 207 and process B 209, which are additional instances of process A 203 and process B 205, respectively. Arrival machine 250 is depicted at a state after processes are completely migrated, and process-depending pages are present in virtual memory 281. Arrival machine uses paging device 260 and physical memory 270 to provide physical storage to pages. Virtual machine manager (VMM) routine 285 is a software component that organizes the virtual memory pages accessed by paging device 260 and physical memory 270. VMM routine 285 may be a process running on arrival machine 250. VMM routine 285 may rely on page table 286 to obtain data when a process accesses data of a page.

Page table 286 is a data structure that provides a mapping between pages and a paging device that is remote to the arrival machine. A page table is a data structure that maps virtual memory addresses to physical memory addresses. A physical memory address can correspond to physical memory or to data stored on a block storage device, such as for example, a hard drive, or a paging device. A page table can be, for example, an inverted page table (IPT), external page table (XPT), or hierarchical page table. The external page table data structure includes a segment, page number and offset when the page data can be found in the paging device. An offset is a number of bytes from an end or outer limit of a page to a referenced byte within the page, including the referenced byte.

A remote paging device is a paging device that uses a remote backing storage that is remote from a physical memory. Pages are accessed over the network. Accordingly, paging device 220 is a paging device that is remote to arrival machine 250. Remote paging device 226 is an abstraction that shows that virtual memory 281 has a third source for physical storage in addition to paging device 260 and physical memory 270. As such, remote paging device 226 is not actually present on arrival machine, but may behave, in some ways, as if the remote paging device were present on the arrival machine. In other words, but for latencies in accessing pages remotely, the remote paging device can operate in a manner indistinguishable from a local paging device, with respect to the arrival machine.

Support for remote paging device functionality is provided by kernel process 289. Kernel process 289 is a remote paging kernel process, and may communicate directly with NFS client 249, and thereby obtain page references from swap disk 225. Such page references are accordingly used to locate actual page data in the departure machine. Consequently, the actual page data is sent through the network 245, network adapters 243 and 247, and network file system (NFS) server 241. A remote paging kernel process is a process that executes to provide an interface to a software component to access a paging device that is remote from the data processing system upon which the software component executes. Kernel process may also access VMM routine 285 through page table 286.

Figure 3A:
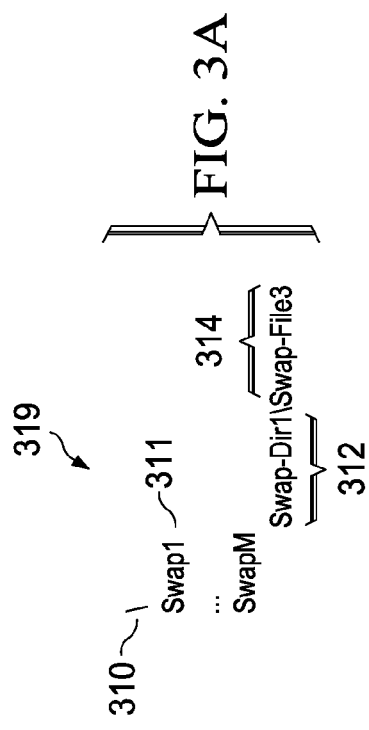
FIG. 3A is swap disk directory hierarchy in accordance with an illustrative embodiment of the invention.

FIG. 3A is swap disk directory hierarchy in accordance with an illustrative embodiment of the invention. A directory hierarchy is at least a directory and a file contained therein. The directory hierarchy can include directory 312 subordinate to root directory 310. Directory 312 can contain at least one file, for example, swap-file3 314. The presence of a directory hierarchy may support exporting NFS version 4 files. Alternatively, a file directly contained in root, for example, "SWAP1" 311 can support exporting NFS version 2 files. For each export session, a file is established. Accordingly, swap disk directory hierarchy 319 may support three concurrent export sessions. The files and directories may be stored to pages referenced by swap disk 225 of FIG. 2. In the initial stages of migrating processes, the departure machine creates a paging memory file system (PMEMFS) file. A PMEMFS file is a file that contains metadata in the form of file references to pages stored to paging device 220 or physical memory 230. Accordingly, a page-in request issued by an arrival machine may first be handled in the translation table 240 to locate a corresponding PMEMFS file, and in particular, one or more pages described in the request. In response to finding each page, the departure machine transmits the page to the arrival machine. Operation of the PMEMFS file may be read-only by virtue of the PMEMFS file being hosted on a read-only swap disk.

Figure 3B:
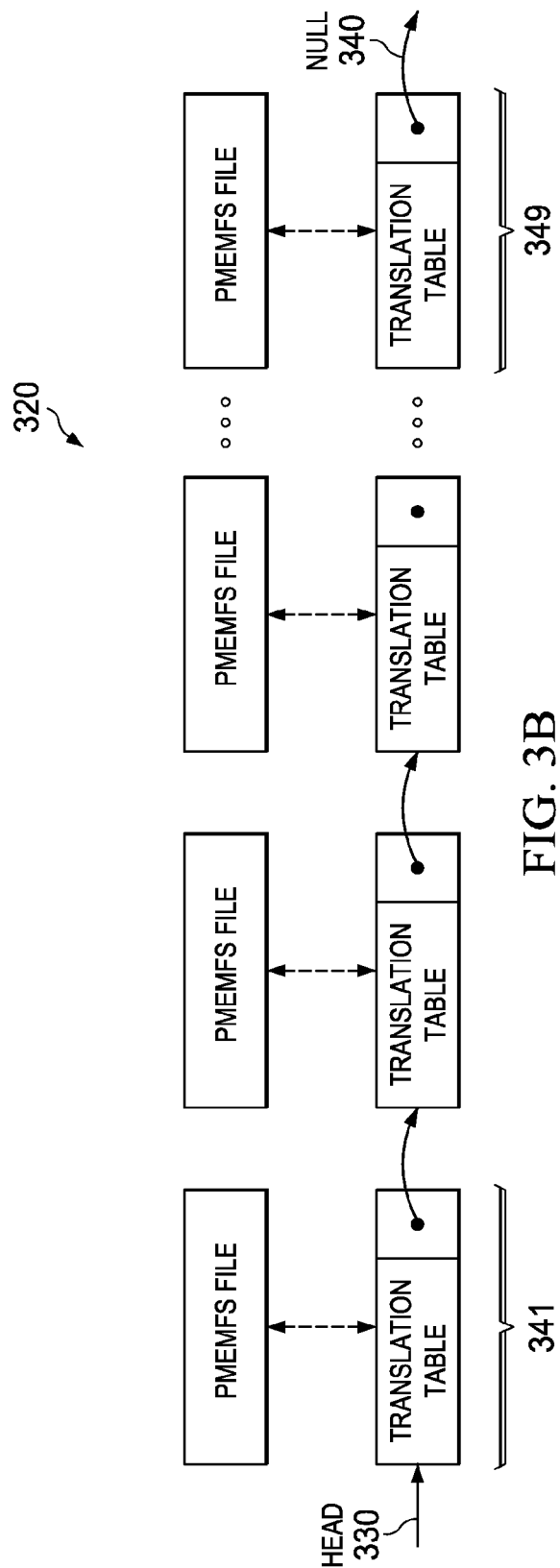
FIG. 3B is a translation table to swap file correspondence in accordance with an illustrative embodiment of the invention.

FIG. 3B is a translation table to swap file correspondence in accordance with an illustrative embodiment of the invention. A translation table list is a list of translation tables that each are associated with a PMEMFS file or a file of the swap disk. The swap disk is for example, swap disk 225 of FIG. 2. The translation table is used to respond to page fault requests or page-in requests. A page-in request is a request made by a VMM to obtain a page from a local paging device or a remote paging device. The page-in request may be a network file system (NFS) operation in accordance with an access described by network file system standard, defined further in request for comment (RFC) 1094 and RFC 3530, published by the Internet Engineering Task Force (IETF) and incorporated herein by reference. RFC 1094 and RFC 3530 describe, respectively, NFS version 2 and NFS version 4, respectively. The NFS operation may include, for example, read, readlink, and readdir.

Translation table list 320 is comprised of a linked list of nodes. Each node is a translation table that is associated each with a file of swap disk 225. Head pointer 330 points to the first translation table in the list of nodes. Tail pointer 340 is a null pointer that is used to identify that no additional nodes exist in the list. Translation tables are, for example, nodes 341 and node 349.

Figure 3C:
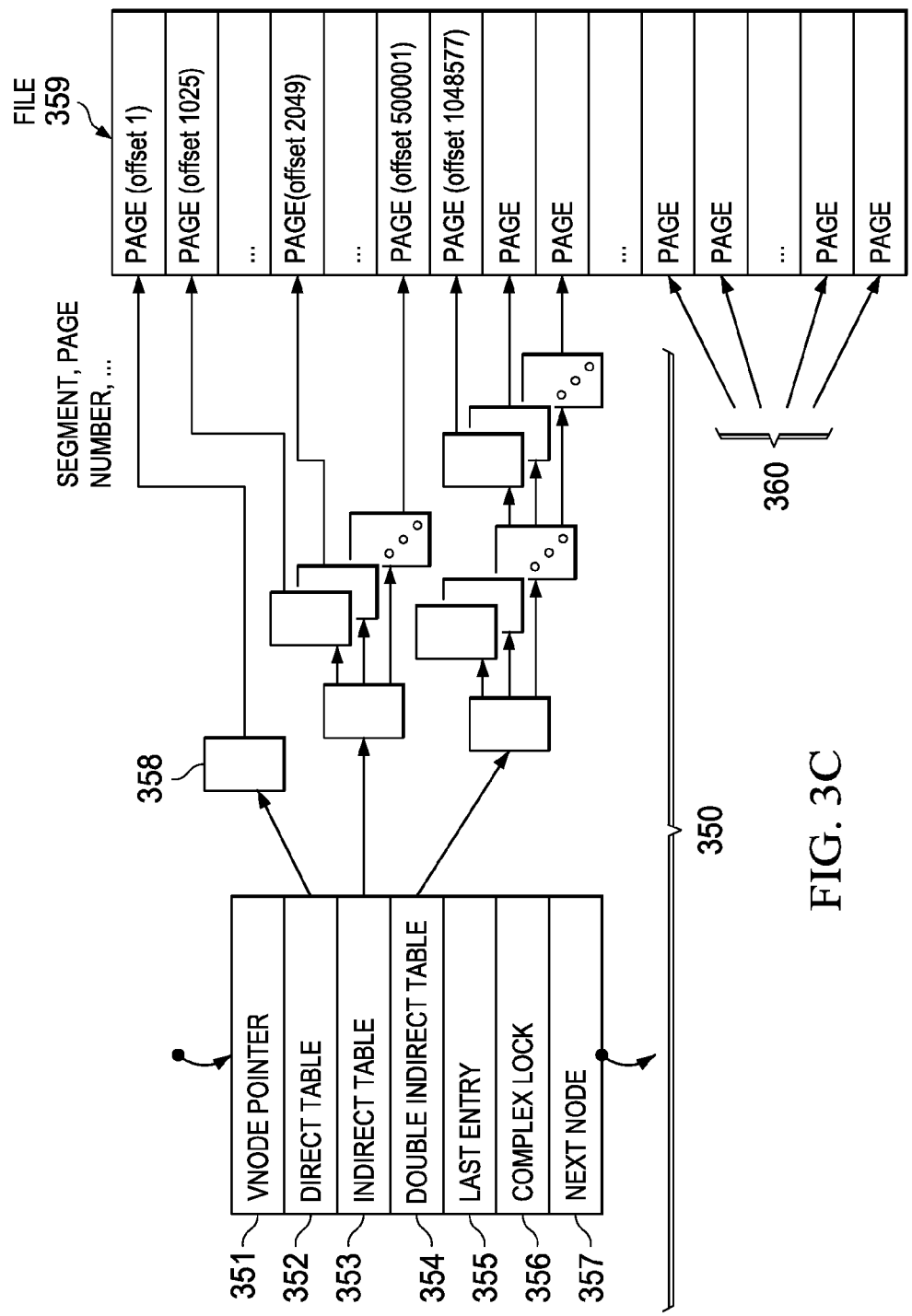
FIG. 3C is a translation table node in accordance with an illustrative embodiment of the invention.

FIG. 3C is a translation table node in accordance with an illustrative embodiment of the invention. Translation table 350 can include vnode pointer 351, direct table 352, indirect table 353, double indirect table 354, last entry 355, complex lock 356, and next node 357. Translation table 350 is, for example, translation table 341 of FIG. 3B. Next node 357 may be a link between translation tables, or a null pointer. Direct table 352, indirect table 353, and double indirect table 354 each reference an entry of a PMEMFS file either directly or indirectly. Each PMEMFS file may include at least one segment and page number. The segment and page number reference directly the page in the virtual memory system of the departure machine. The page is stored to either a paging device or to a physical memory, for example, paging device 220 or physical memory 230 of FIG. 2. A reference is, for example, reference 358. A file handle may also be present in each reference. The file handle uniquely identifies a file in the departure machine. The offset can be used to locate the entry. The multi level table entries can to support large number of processes. The collection of references of the translation table points to the entries of file 359. Each entry is metadata that references the page, for example, in paging device 220 or physical memory 230.

Departure machine receives page-in requests shortly after processes are resumed on the target machine. Each page-in request includes a file handle and offset that corresponds to a file in the swap disk. A software function, pmemfs_read, looks up the corresponding segment and page number in translation table 350 in order to obtain a page. A page number is a serial number used by each page in a segment. Accordingly, each page within a segment has a different page number. The departure machine next transmits the page via NFS server and network adapter to the arrival machine.

Figure 4:
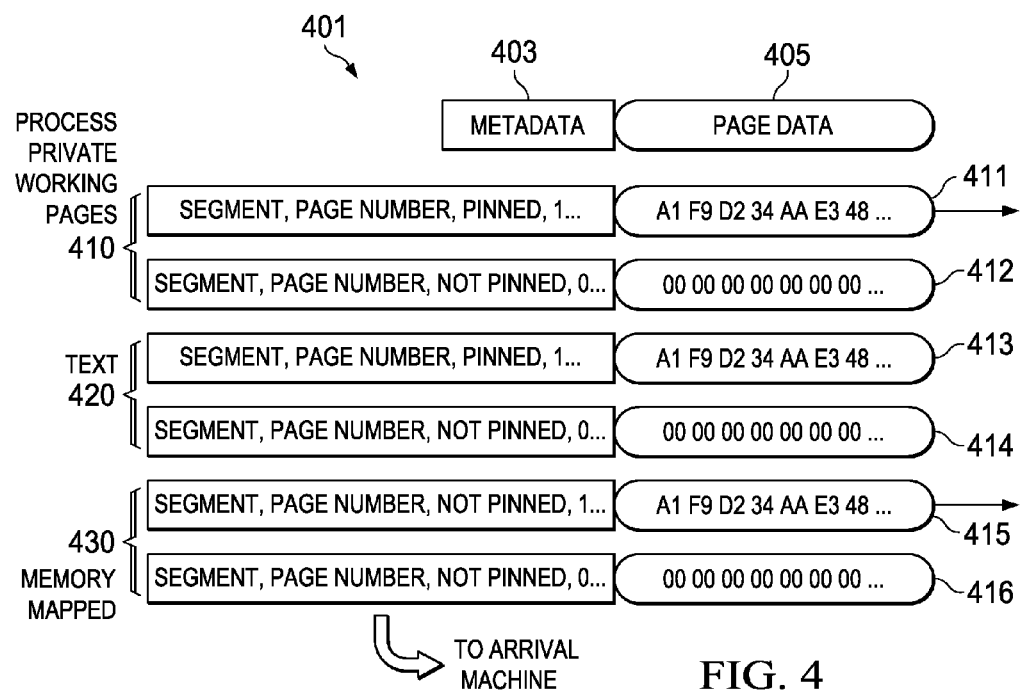
FIG. 4 is a diagram of pages in managed by a data processing system in accordance with an illustrative embodiment of the invention.

FIG. 4 is a diagram of pages in managed by a data processing system in accordance with an illustrative embodiment of the invention. Each page is managed by a virtual memory system. Each page has two parts as shown by page 401. A first part is metadata 403, and a second part is page data 405. Metadata is simply data about data. In other words, the metadata describes characteristics of the data. Such characteristics can include, for example, location, memory state, page type, among others. A memory state is an indication whether the page is pinned or unpinned. A pinned page is a page that is flagged as not being permitted to be paged-out from physical memory. An unpinned page is not restricted in the virtual memory system. In other words, the unpinned pages may be paged-out to the paging device. A single bit in the page metadata may indicate pinned using a logical '1', and unpinned using a logical '0'.

Other metadata includes location information such as segment and page number. A segment is a group of one or more pages assigned for use by a process. Each segment can segregate a group of pages according to the purpose of the pages. For example, a text segment can hold executable code for the process, while a private working segment can hold pages storing variables and data structures accessed by the process. A page number is a serial number used by each page in a segment. Accordingly, each page within a segment has a different page number.

A page type is a description of whether the page is zeroed out or if the page carries heterogeneous data. Heterogeneous data is data that is not the same data in every byte of the page.

Figures 5A, 5B:
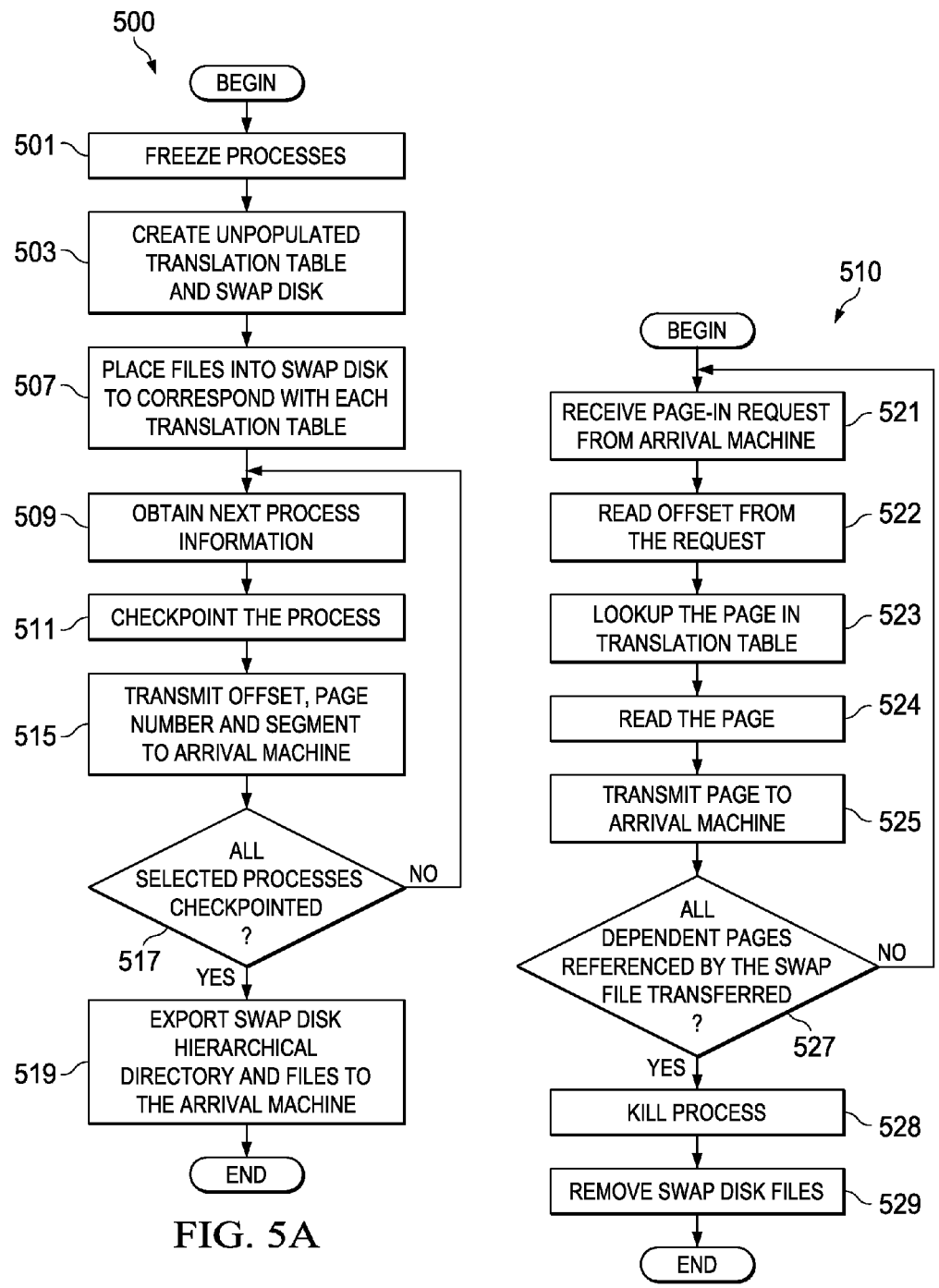
FIG. 5A is a flowchart of freezing processes on a departure machine in accordance with an illustrative embodiment of the invention.
FIG. 5B is a flowchart of responses on the departure machine to page-in requests in accordance with an illustrative embodiment of the invention.

FIG. 5A is a flowchart of a preparatory process on a departure machine in accordance with an illustrative embodiment of the invention. A departure machine performs the steps of preparatory process 500. Initially, the departure machine freezes processes (step 501). The frozen processes may be process B 203 and process C of FIG. 2. Next, the departure machine may create a data structure to store pages that may be subject to paging-in. This step may include the departure machine creating an unpopulated translation table and swap disk (step 503). In addition, creating the data structure may include creating a translation table for each file that a migrating process depends. Next, the departure machine places a file into the swap disk to correspond with each translation table (step 507). The file may contain metadata that directs a process that accesses pages to either paging device 220 or physical memory 230 in order to obtain data content of the file. Next, the departure machine obtains process information beginning with a first process selected for migration. Thus, the departure machine obtains the next process's information (step 509).

Next, the departure machine checkpoints the process (step 511). As part of the checkpoint process, the departure machine adds segment and page numbers for selected pages to match each such page to a translation table. The translation table, as explained above with respect to FIG. 3B, is built with corresponding files as PMEMFS files in a swap disk. The departure device may exclude from checkpointing pages that are zeroed out or are text pages. Text pages are pages that contain instructions for a data processing system. Next, the departure machine transmits offset, page number and segment information for the applicable pages to the arrival machine (step 515). The departure machine determines if all selected processes are checkpointed (step 517). If not, the departure machine resumes step 509.

However, if all selected processes are checkpointed, the departure machine continues by exporting the swap disk directory hierarchy and files to the arrival machine (step 519). The departure machine may perform this step by transmitting each file handle to the arrival machine. Processing terminates thereafter.

FIG. 5B is a flowchart of responses on the departure machine to page-in requests in accordance with an illustrative embodiment of the invention. Initially, the departure machine receives a page-in request from the arrival machine (step 521). Next, the departure machine reads offset information from the request (step 522). Based on the request, the departure machine looks-up the page in the translation table (step 523). The translation table may be, for example, translation table 235 of FIG. 2. Next, the departure machine reads the page or pages referenced in the look-up table (step 524). When the departure machine builds a translation table, the departure machine breaks any page that is 16K or larger into 4K pages. Accordingly, each page has an offset at a 4K boundary. Such a page breakdown makes it possible for the departure machine to respond to requests that are as small as 4K page sizes by providing pages singly, or alternatively, responding to requests for 16K and larger pages by transmitting four or more 4K pages in response thereto. Each such page may be located by using the segment and page number present in a translation table.

Next, the departure machine transmits the page or pages to the arrival machine (step 525). Next, the departure machine determines whether all dependent pages referenced by the swap file have been transferred (step 527). If not all dependent pages have been transferred, the departure machine may resume processing at step 521.

However, if all dependent pages have been transferred, the departure machine may kill the process (step 528). Next, the departure machine may remove the swap disk files (step 529). Processing terminates thereafter.

The flowchart of FIG. 5A, above, describes on one hand, steps performed at the departure machine to set up, within the arrival machine, initial bootstrapping information corresponding to migrating processes. On the other hand, FIG. 5B describes the manner in which the departure machine responds to requests from the arrival machine issued in response to obtaining the bootstrapping information. The bootstrapping information is the information sent, for example, at step 515, for example, offset, page number and segment information.

Figure 6:
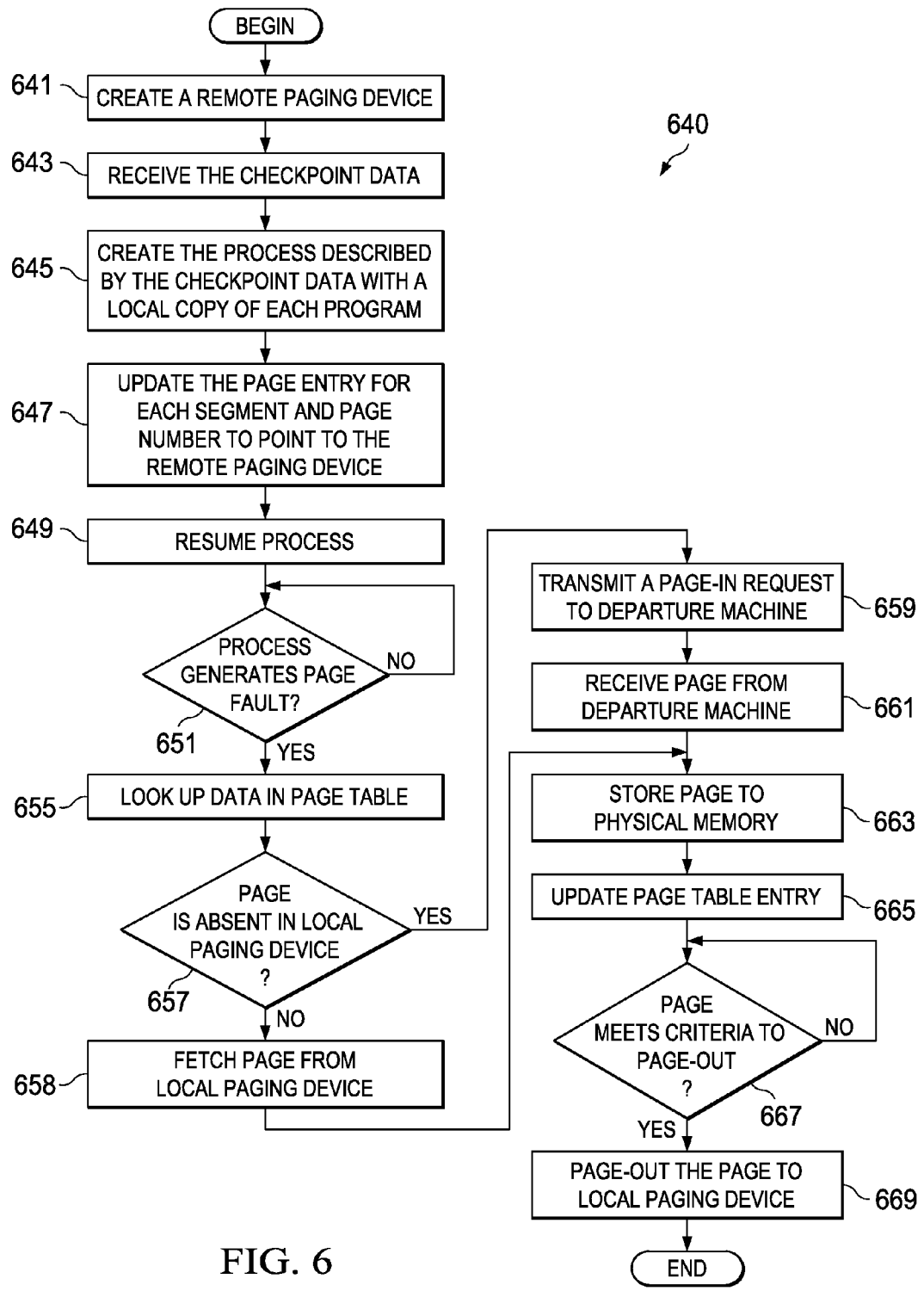
FIG. 6 is a flowchart of arrival machine steps to establish copies of pages used by frozen processes in the departure machine in accordance with an illustrative embodiment of the invention.
Figure 7:
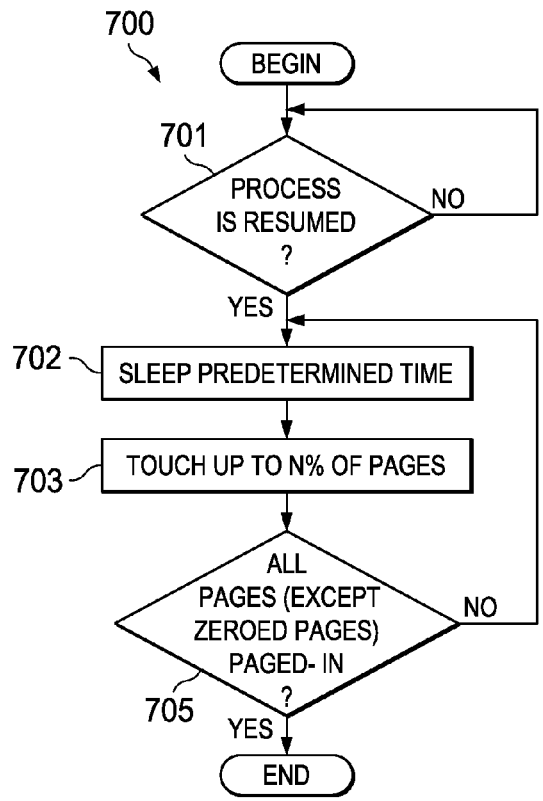
FIG. 7 is a flowchart of residual importation of pages following on-demand reception of pages in accordance with an illustrative embodiment of the invention.

FIGS. 6 and 7, below, explain the manner in which the arrival machine restarts the selected processes, and then, how the arrival machine pages-in pages that firstly, are not expressly required by the processes during the initial seconds of execution, and secondly, may not be paged-in promptly after the initial seconds of execution during process resumption.

FIG. 6 is a flowchart of arrival machine steps to establish copies of pages used by frozen processes in the departure machine in accordance with an illustrative embodiment of the invention. The process of FIG. 6 shows on-demand paging process 640 a process that allows the arrival machine to page-in pages on-demand, that is, upon the requirement or request by a resumed process to obtain a page stored to the departure machine. Initially, the arrival machine creates a remote paging device (step 641). Creating the remote paging device involves initiating a process that executes to provide an interface to a software component to access a paging device remote from the data processing system, for example, kernel process 289 of FIG. 2. Consequently, remote paging device 226 is accessed from the remote paging kernel process to bring in pages from swap disk 225 as if the swap disk were a paging device local to the arrival machine.

Next, the arrival machine receives checkpoint data (step 643). Checkpoint data is data of a process that can be used to restart or resume the process at a state identical to a time that the checkpoint data is collected. Checkpoint data includes process state information. A process state is an instruction pointer of the process, any call history, and variables associated with the process. Next, the arrival machine creates each process described by the checkpoint data with a local copy of each program (step 645). The local copy of each program is merely an instance of the frozen processes of the departure machine such that all state information is available to the arrival machine. The local copy can include copies of the process name, owner, and permissions of the frozen process, among others. Next, the arrival machine updates the page table entry for each segment and page number to point to the remote paging device (step 647). In other words, references to memory by the processes are all directed by references to the remote paging device, at this point. Next, the arrival machine resumes each process (step 649). The processes resumed are those processes described in the checkpoint data received at step 643.

Next, the arrival machine may determine whether the process generates a page fault (step 651). A page fault is a processor interrupt that is generated in response to a process making a page request for a virtual memory address does not have a corresponding physical memory address. A page fault can be generated when, for example, the virtual memory address corresponds to a page stored on a paging device. A page request is a request to access memory by a process in a data processing system that manages pages by a virtual memory manager routine. A page request may be, for example, a request to read one or more pages. A plurality of page requests may arrive to a departure machine from an arrival machine without intervening requests to write data to a page of the departure machine. Next, the arrival machine looks up the data referenced in the page fault in the page table (step 655). The page table can be page table 286 of FIG. 2. Such a page table, in coordination with a remote paging kernel process can provide a segment, page number and offset for a page. Such a page may reside in a paging device that serves as the backing store for the page.

Next, the arrival machine determines if the page is absent from the local paging device (step 657). The arrival machine may determine absence by locating the page reference in the page table, and discovering the page reference to point to the remote paging device. If the page is absent, transmits a page-in request to the departure machine (step 659). Next, the arrival machine may receive a page from the departure machine (step 661).

However, if the page is present in the local paging device, the arrival machine fetches the page from the local paging device (step 658). Next, and following step 661, the arrival machine stores the page to physical memory (step 663). In addition, the arrival machine updates a page table entry (step 665). Updating the page table entry entails the VMM routine 285 of FIG. 2 updating the page table to reflect the presence of the page in physical memory.

Next, the arrival machine may determine if the page meets criteria to page-out the page (step 667). A criteria to page-out is a determination that a page is unused, or less likely to be used that an already paged-out page. The criteria to page-out may include a determination that physical memory is inadequate to satisfy a request for paging-in the already paged-out page.

The arrival machine may experience a negative result of step 667. Accordingly, the arrival machine may repeatedly make this determination with respect to the page, or other pages in physical memory if the page initially does not meet the criteria to page out. Nevertheless, at some point, the determination at step 667 is positive. At that time, the arrival machine pages-out the page to a local paging device (step 669). A local paging device is a paging device that is local with respect to the physical memory from which a page is paged-out. Processing may terminate thereafter.

FIG. 7 is a flowchart of residual importation of pages following on-demand reception of pages in accordance with an illustrative embodiment of the invention. Residual importation process 700 can avoid an initial bottleneck of traffic driven by on-demand paging. Residual importation process 700, can achieve this moderation of contention for the wire by delaying operation of paging-in pages sufficiently for on-demand paging to abate somewhat, and page-in pages on a more gradual, and complete basis. In effect, residual importation process 700 can fill-in gaps left by the on-demand paging process described in FIG. 6 in that the arrival machine can import pages, which may not have been brought by the execution of the various processes. Initially, the arrival machine determines whether a process is resumed (step 701). A negative result will repeat the determination process until the system responds. A resumed process is a process that begins as an arbitrary instruction of computer readable instructions of the process. The resumed process may be associated with a frozen instance of the resumed process.

Next, the arrival machine may sleep a predetermined time (step 702). A predetermined time is a time selected that is expected to allow the wire or network to be less than half occupied by processes paging-in pages from the arrival machine. Put another way, the predetermined time is selected such that the most bottlenecked element in the communication path between the remote paging device and the local physical memory is likely to be less than half utilized by on-demand paging-in of pages.

Next, the arrival machine may touch up to a fraction of pages (step 703). The term 'touch' or 'touching' refers to transferring a page from a remote paging device to physical memory and updating the page table accordingly. A fraction of pages is a portion of pages that are targeted for migration. The fraction of pages may be, for example, a fraction of pages referenced in the page table. The fraction of pages may be, for example, a portion of pages among the migrating pages 235 of FIG. 2. Each iteration of step 703 may involve touching a fraction of pages not previously touched by the arrival machine. Each touching of pages can exclude paging-in pages that have already been paged-in by the on-demand paging process described above with reference to FIG. 6. Pages not requested by the resumed process can include pages that have not already been paged-in by the on-demand paging process, or a subset thereof. In addition, each touching of pages may exclude paging-in pages that are zeroed pages. Instead, the arrival machine may independently create such zeroed pages without placing overhead on the wire.

Next, the arrival machine may determine whether all pages relied on by the resumed processes have been touched (step 705). In some embodiments, an arrival machine may perform step 705 to consider all-pages-relied-on to exclude pages specifically excluded from touching, such as, for example, zeroed pages, and pages already paged-in on demand. The arrival machine may consider, at step 705, the status of pages such as migrating process pages 235 of FIG. 2. A positive outcome to step 705 may result in the arrival machine sleeping a process that executes steps of residual importation process 700. The process may terminate thereafter.

Second and third executions of sleeping step 702 may include applying a predetermined time that is selected dynamically from a set of latency periods. A latency period is a time period that may be selected to be smaller for second and third sleeping periods based on a reduction on paging-in pages on-demand. A final fraction of pages may be touched prior during a final execution of step 703 ahead of determining that all pages are paged-in. The final fraction of pages may be smaller than an initial fraction of pages touched, for the reason that the cumulative effect of on-demand paging and prior touching by the residual paging process may have reduced a number of pages remaining to page-in from the departure system.

The combination of on-demand paging and the residual importation process can reduce the number of pages not yet paged-in to the arrival system to below the final fraction of pages within a minute of resuming the processes targeted for migration.

Figure 8A:
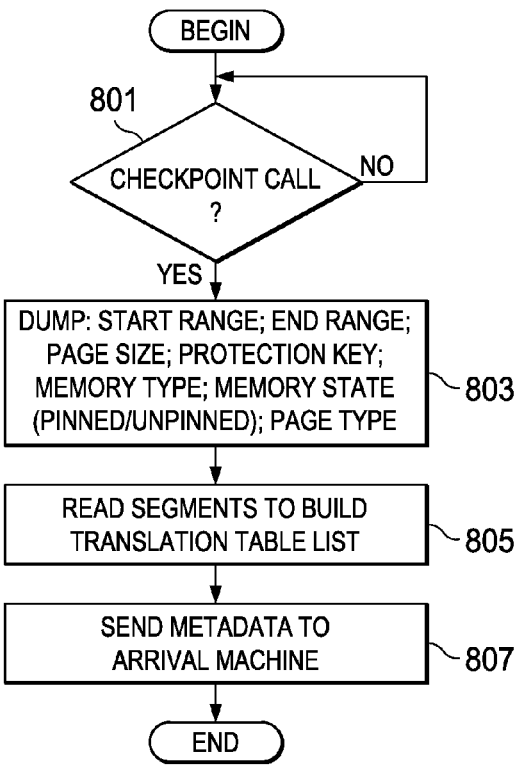
FIG. 8A is a flowchart of detailed steps that may perform the checkpoint step of FIG. 5A in accordance with an illustrative embodiment of the invention.

FIG. 8A is a flowchart of detailed steps that may perform the checkpoint step of FIG. 5A. Initially, a departure machine may determine if a checkpoint call has occurred (step 801). A checkpoint call can occur when the step 511 of FIG. 5A is reached. A negative determination at step 801 may cause repeated determinations at step 801.

A positive determination at step 801 may cause the departure machine to dump metadata concerning the pages on which the process determines. Accordingly, the departure machine may dump a start range, an end range, a page size, a protection key, a memory type, a memory state, and a page type (step 803). Step 803 may be performed for each page such that at a minimum, the departure machine obtains a segment, a memory type, a memory state and a page type for each page.

Next, the departure machine may read segments to build a translation table list (step 805). Next, the departure machine may send metadata to the arrival machine (step 807). The metadata may be the metadata obtained at step 803. Processing may terminate thereafter.

Figure 8B:
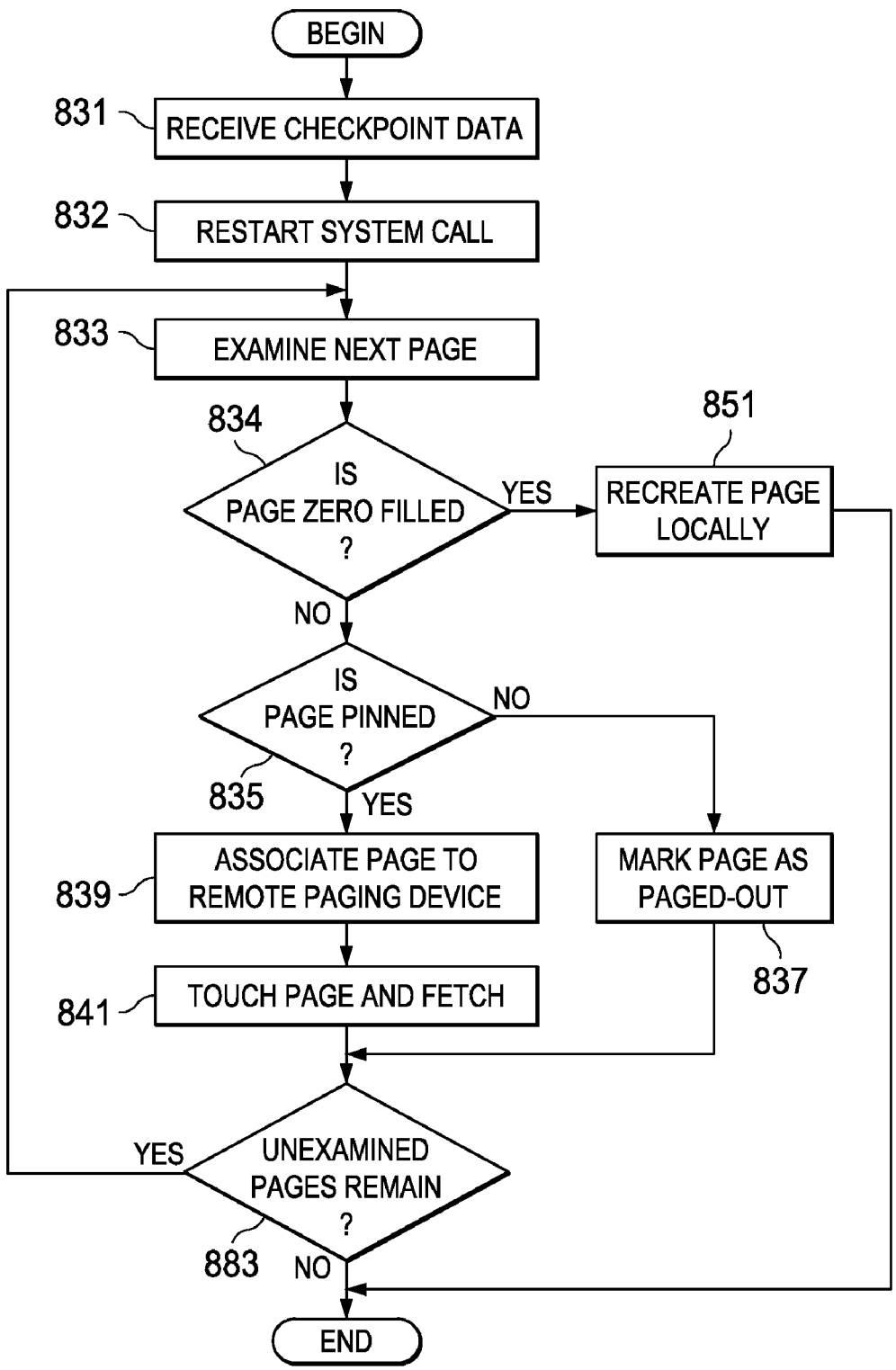
FIG. 8B is a flowchart of detailed steps that may perform the step of receiving checkpoint data of FIG. 6 in accordance with an illustrative embodiment of the invention.

FIG. 8B is a flowchart of detailed steps that may perform the step of receiving checkpoint data of FIG. 6. Initially, the arrival machine may receive checkpoint data (step 831). The checkpoint data may be the checkpoint data transmitted at step 807 above. Next, the arrival machine performs a restart system call (step 832). Next, the arrival machine examines each page, beginning with the next page (step 833). The next page can be the first page located in a page table. The arrival machine may determine if the page is zero filled (step 834). The arrival machine may make this determination by checking the page type. If the page type indicates the page is a zeroed page, then the determination at step 834 is positive. In response to a positive determination, the arrival machine may recreate the zeroed page locally (step 851). Accordingly, the wire is not occupied by zeroed out pages. The process terminates thereafter.

However, if the arrival machine determines the page is not a zeroed page, the arrival machine may determine if the page is pinned (step 835). The page is pinned if the corresponding metadata for the memory state indicates that the page is pinned. If the page is not pinned, the arrival machine marks the page as paged-out (step 837). The page is marked as paged-out in the page table. The process continues at step 883, below.

Alternatively, the arrival machine can determine the page is pinned. Accordingly, the arrival machine associates the page to the remote paging device (step 839). Next, the arrival machine touches the page and fetches the page (step 841). When fetching the page, the arrival machine pages-in the page from a remote paging device. Next, the arrival machine determines if any unexamined pages remain (step 883). If unexamined pages remain, the arrival machine repeats step 833. Otherwise, the process terminates thereafter.

In some instances of process migration, an application software is already installed to the arrival machine. Accordingly, the arrival machine recognizes a match between metadata received from the departure machine and pages already available in the arrival machine. In response to determining that a copy of the page is absent on the arrival machine, the arrival machine may page-in the page from the departure machine. In contrast, the arrival machine may prevent or avoid building page table entries that are redundant to these pages by discarding such matching metadata.

The arrival machine, as part of the touch and fetch step 841, may detect a difference in the page size of the requested page, and the page size of pages native to the arrival machine. This situation can occur when the departure machine uses pages that are 4K in size, while the arrival machine uses pages that are 16K in size. Accordingly, the arrival machine may make a request for the a pinned page, in the native 4K format, as well as three pages that follow the page in the remote paging device. Consequently, the kernel process, for example, may make four page-in requests via the communication path from a swap disk.

Following the steps of FIG. 8B, step 645 may be performed, as well as steps subsequent thereto in on-demand paging process 640 of FIG. 6.

Embodiments of the present invention may migrate pages using processes that can execute, in some cases, concurrently.

A first process is the on-demand paging process which obtains pages from the departure machine as executing processes page fault on each page. Such a process can obtain pages rapidly without wasting time on pages that are not immediately required. A second process is the residual importation process. This process does not exact a heavy toll on the wire immediately following process resumption on the arrival machine. However this process pages-in pages missed by the on-demand process in a manner that allows all pages to be paged-in during the period where an initial rush of on-demand pages has abated. Nevertheless, on-demand pages can be obtained after one or more waves of residual paging-in occur. In addition, the embodiments disclosed may preemptively obtain pages before migrated process resumption. In this third method, pages are established in the arrival machine by noting the presence of identical copies of pages that form application software identical to that present in the departure machine. Moreover, the arrival machine, once noting the presence of identical copies, assures that the page table of the arrival machine points to the page instances present in the arrival machine. Such steps cause the on-demand paging and residual paging processes to avoid paging-in a second copy of such pages, and accordingly, may relieve the traffic burden by these processes across the wire.

In summary, the several illustrative embodiments of the present invention permit rapid throttling up of application processes that are migrated, while assuring completeness in bringing in pages of migrating processes from the departure machine. At the same time, the embodiments can allow the migration to occur on a time-scale that allows a data center manager to complete one or more process migrations during a normal business day.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for prioritizing paging-in pages in a remote paging device, the method comprising:
    receiving checkpoint data from a departure machine;
    restarting at least one process corresponding to the checkpoint data;
    determining whether a page associated with the process is pinned;
    responsive to a determination that the page is pinned, associating the page to the remote paging device;
    touching the page;
    responsive to receiving the checkpoint data from the departure machine, determining whether the page is present on an arrival machine;
    determining whether a copy of the page is absent on the arrival machine; and
    responsive to the copy of the page being absent on the arrival machine, paging-in the page from the departure machine.

2. The computer implemented method of claim 1, further comprising:
    installing an application software on an arrival machine, wherein the application software is also installed to the departure machine.

3. The computer implemented method of claim 1, further comprising:
    responsive to touching the page, resuming the at least one process.

4. The computer implemented method of claim 1, wherein determining whether the page is present further comprises page faulting the page.

5. The computer implemented method of claim 4, further comprising:
   determining whether the page is filled with zeros; and
   generating the page in a local paging device without paging-in the page from the remote paging device.

6. The computer implemented method of claim 1, wherein touching further comprises:
   determining whether at least one arrival machine native page size is a multiple of a departure machine native page size; and
   responsive to a determination that at least one arrival machine native page size is a multiple of the departure machine native page size, making a page-in request for three pages proximal to a second page in the remote paging device corresponding to the page.

7. A computer program product for prioritizing paging-in pages in a remote paging device, the computer program product comprising: one or more computer-readable, tangible storage devices having computer usable program code embodied therewith, the computer program product comprising:
   computer usable program code configured to receive checkpoint data from a departure machine;
   computer usable program code configured to restart at least one process corresponding to the checkpoint data;
   computer usable program code configured to determine whether a page associated with the process is pinned;
   computer usable program code configured to associate the page to the remote paging device, responsive to a determination that the page is pinned;
   computer usable program code configured to touch the page;
   computer usable program code configured to determine whether the page is present on an arrival machine, responsive to receiving the checkpoint data from the departure machine;
   computer usable program code configured to determine whether a copy of the page is absent on the arrival machine; and
   computer usable program code configured to page-in the page from the departure machine, responsive to the copy of the page being absent on the arrival machine.

8. The computer program product of claim 7, further comprising:
   computer usable program code configured to install an application software on an arrival machine, wherein the application software is also installed to the departure machine.

9. The computer program product of claim 7, further comprising:
   computer usable program code configured to resume the at least one process, responsive to touching the page.

10. The computer program product of claim 7, wherein determining whether the page is present further comprises page faulting the page.

11. The computer program product of claim 10, further comprising:
    computer usable program code configured to determine whether the page is filled with zeros; and
    computer usable program code configured to generate the page in a local paging device without paging-in the page from the remote paging device.

12. The computer program product of claim 7, wherein touching further comprises:
    computer usable program code configured to determine whether at least one arrival machine native page size is a multiple of a departure machine native page size; and
    computer usable program code configured to make a page-in request for three pages proximal to a second page in the remote paging device corresponding to the page, responsive to a determination that at least one arrival machine native page size is a multiple of the departure machine native page size.

* * * * *